United States Patent
Fujii

(10) Patent No.: US 8,288,703 B2
(45) Date of Patent: Oct. 16, 2012

(54) PHOTODETECTION DEVICE

(75) Inventor: Isamu Fujii, Chiba (JP)

(73) Assignee: Seiko Instruments Inc. (JP)

( * ) Notice: Subject to any disclaimer, the term of this patent is extended or adjusted under 35 U.S.C. 154(b) by 320 days.

(21) Appl. No.: 12/800,688

(22) Filed: May 20, 2010

(65) Prior Publication Data

US 2010/0294918 A1    Nov. 25, 2010

(30) Foreign Application Priority Data

May 21, 2009  (JP) .................................. 2009-123473

(51) Int. Cl.
*H03F 3/08* (2006.01)
(52) U.S. Cl. .................................................. 250/214 A
(58) Field of Classification Search ............... 250/214 A, 250/214.1, 214 R, 208.1
See application file for complete search history.

(56) References Cited

U.S. PATENT DOCUMENTS

| 2005/0264663 A1* | 12/2005 | Sato ............................. 348/297 |
| 2007/0097349 A1* | 5/2007 | Wada et al. ................... 356/4.06 |
| 2007/0245081 A1* | 10/2007 | Ogawa .......................... 711/114 |
| 2007/0247106 A1* | 10/2007 | Kawahara et al. ............ 320/104 |
| 2010/0270997 A1* | 10/2010 | Riedel ............................ 323/311 |

OTHER PUBLICATIONS

Patent Abstracts of Japan, publication No. JP 11-211563, publication date Aug. 6, 1999.
Patent Abstracts of Japan, publication No. JP 2005-241306, publication date Sep. 8, 2005.

\* cited by examiner

*Primary Examiner* — Seung C Sohn
(74) *Attorney, Agent, or Firm* — Adams & Wilks

(57) ABSTRACT

An electric charge storage method is used in which a photoelectric current generated in a photodiode is stored for a predetermined time period and the stored electric charge is amplified by an amplifier to obtain an output. Further, the storage time period is switched so that an output from the circuit has a characteristic of a piecewise linear approximation of a logarithm of an illuminance, permitting a sufficient resolution even in darkness.

3 Claims, 5 Drawing Sheets

Prior Art

Prior Art

PHOTODETECTION DEVICE

BACKGROUND OF THE INVENTION

1. Field of the Invention

The present invention relates to a photodetection device for converting photocurrent generated in a photoelectric conversion element to voltage.

2. Description of the Related Art

A photodetection device converts photocurrent, which is generated according to an illuminance of a light entering a photoelectric conversion element such as a photodiode or a phototransistor, into a voltage for output.

Amount of the photocurrent generated in the photoelectric conversion element such as the photodiode or the phototransistor is proportional to the illuminance. One form for the output voltage from the conventional photoelectric conversion circuits for converting photocurrent to a voltage is proportional to the illuminance of the light, and another form is proportional to a logarithmic value of the illuminance of the light.

A photodetection device disclosed in JP 11-211563 A shown in FIG. 4, for example, adopts a method in which a photocurrent, which is generated in a photodiode 1 by light, is converted to a voltage by an amplifier 2 with the help of a resistor 3, to thereby obtain an output voltage as a linear equation of a magnitude of the current generated in the photodiode, permitting acquisition of a voltage proportional to an illuminance of the light.

As another example, FIG. 5 shows a photodetection device disclosed in JP 2005-241306 A in which a diode 1 is connected in series with a phototransistor 4 serving as a photoelectric conversion element, and in which an amplifier 2 and a resistor 3 are provided so that an output voltage is proportional to a logarithmic value of a magnitude of a photocurrent generated in the phototransistor, utilizing the fact that a current-voltage characteristic of the diode is exponential. The magnitude of the photocurrent is proportional to an illuminance, and hence an output in proportion to the logarithmic value of the illuminance of the light can be obtained. High resolution for detecting the illuminance can be obtained at low illuminance.

Obtaining the output proportional to the logarithmic value of the illuminance of the light is accompanied by the following problems.

First, current consumption of the photodetection device tends to be large since a current should be fed to the photoelectric conversion element continuously in order to obtain the output voltage, and since a current flowing through a light receiving element should be large enough to improve a signal-to-noise (SN) ratio to obtain sufficient sensitivity. Second, the output from the circuit is logarithmic, and hence simple and accurate signal processing using a digital circuit is difficult to be performed afterward.

SUMMARY OF THE INVENTION

The present invention has been made in order to solve the above-mentioned problems, using a charge storage method in which an electric charge generated in a photodiode is stored for a predetermined time period, and the stored electric charge is amplified by an amplifier to obtain an output. Further, the storage time period is switched so that the output from the circuit has a characteristic of a piecewise linear approximation of a logarithmic value of an illuminance.

Specifically, the present invention provides a photodetection device for converting a photocurrent generated based on an illuminance of light input to a photoelectric conversion element to a voltage, in which the photocurrent generated in the photoelectric conversion element is stored as an electric charge for a predetermined storage time period, the stored electric charge is amplified to obtain an output voltage, and the storage time period is switched so that the output voltage has a characteristic of a piecewise linear approximation of a logarithm of the illuminance.

By using the charge storage method, power consumption may be reduced compared to a current-voltage conversion method. Further, the output of the circuit has the characteristic of the piecewise linear approximation of the logarithm, and hence an output with a wide dynamic range may be obtained compared to a linear type circuit whose output is a voltage proportional to the illuminance. An illuminance-voltage conversion characteristic optimal for a target system may be realized by combining a plurality of linear characteristics. As to a circuit scale, the charge storage method may be realized upon a base of linear type circuit by merely adding a small-scale circuit.

DETAILED DESCRIPTION OF THE PREFERRED EMBODIMENT

Figure 1:
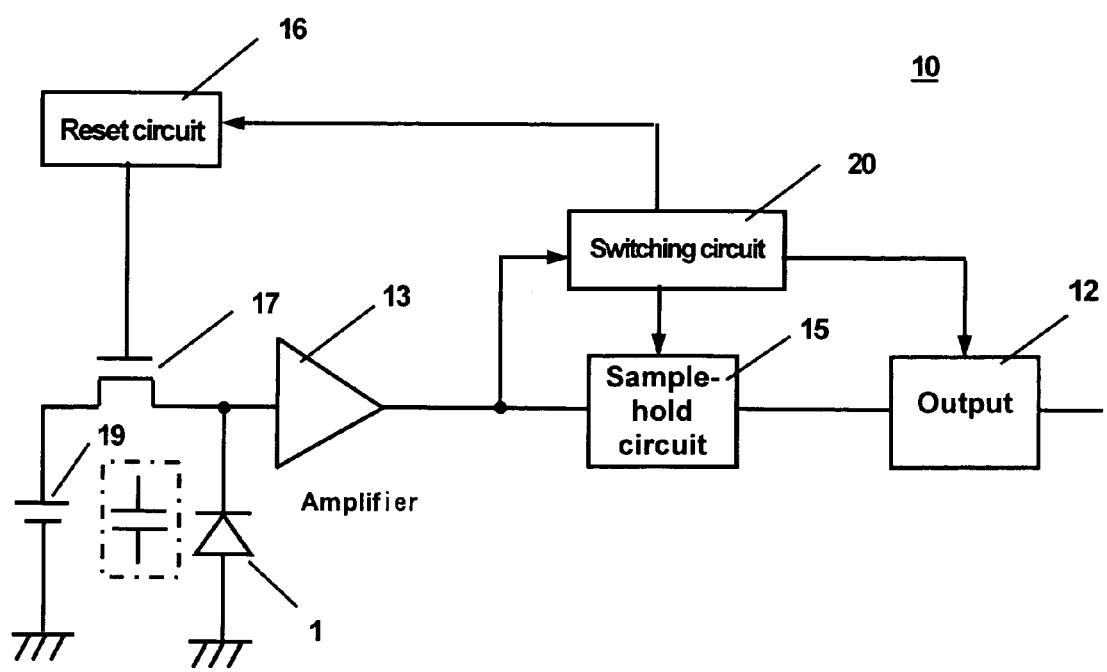
FIG. 1 is a block diagram for illustrating an example of a photodetection device according to the present invention.

FIG. 1 is a diagram for illustrating a configuration of a photodetection device 10 according to an embodiment of the present invention.

The photodetection device 10 is used, for example, as an illuminance meter for measuring an ambient illuminance, and is also used, for example, for adjusting a luminance of a backlight in a liquid crystal display screen of a mobile phone.

A photodiode 1 is a photoelectric conversion element that generates a photocurrent corresponding to an illuminance of incident light, and includes an anode terminal that is grounded and a cathode terminal that is connected to an amplifier 13 and to a direct-current (DC) power source 19 through a switch 17 so as to be reverse biased. The switch 17 is constituted of a switching element such as a transistor, and connects and disconnects the photodiode 1 and the DC power source 19 in response to a reset signal from a reset circuit 16. The amplifier 13 is constituted of an amplifier circuit such as an operation amplifier, detects and amplifies a voltage of the cathode terminal of the photodiode 1, and is connected to a sample-hold circuit 15 and switching circuit 20. The amplifier 13 has, for example, a substantially infinite input impedance so that a current from the photodiode 1 does not flow thereinto, and hence is able to amplify the voltage generated in the photodiode 1 without affecting the voltage. The DC power source 19 is constituted of, for example, a constant voltage circuit so as to set the cathode terminal of the photodiode 1 to a reference voltage when the switch 17 is turned on.

On the other hand when the switch 17 is turned off, the cathode terminal is set to an electrically open state (floating state) and an electric charge corresponding to a light intensity is stored in the photodiode 1. In this case, the photodiode 1 has been reverse-biased by the DC power source 19, and hence the voltage of the cathode terminal is reduced by electrons generated in the photodiode 1.

As described above, an amount of the electric charge stored in the photodiode 1 can be detected as the voltage. Further, the voltage reduction rate is inversely proportional to a generation rate of the electrons, that is, the light intensity.

When the switch 17 is turned on again, the electric charge stored in the photodiode 1 is reset to an initial state, and the voltage of the cathode terminal is set to the reference voltage. The reset circuit 16 switches a reset interval depending on a result of judgment by the switching circuit 20, and transmits the reset signal at predetermined intervals to turn on and off the switch 17. Accordingly, the reset circuit 16 turns on the switch 17 to reset the voltage of the cathode terminal of the photodiode 1 to the reference voltage (in other words, the electric charge stored in the photodiode 1 to an initial value), and turns off the switch 17 to store the electric charge in the photodiode 1.

As described above, the reset circuit 16 and the switch 17 work as storage means for causing the electric charge generated by a light receiving element to be stored by setting a terminal of the light receiving element to an open state, and also work as reset means for resetting the electric charge stored in the light receiving element by connecting a predetermined electrode (in this case, cathode terminal) of the light receiving element to a predetermined constant voltage source (DC power source 19).

The sample-hold circuit 15 may be constituted of, for example, an operational amplifier, a switch, a resistor, and a capacitor, and holds an output voltage level from the amplifier 13 at timings generated by the switching circuit 20. The voltage held by the circuit is sent to the output circuit 12. Accordingly, the sample-hold circuit 15 functions as means for acquiring a measurement value of the electric charge stored in the light receiving element (photodiode 1), and also functions as means for holding the acquired output until the next measurement.

Description has been made of a case where the photodiode is used as the photoelectric conversion element for obtaining the photocurrent corresponding to the illuminance of the light, but a phototransistor or other sensor may be used instead.

Figure 2:
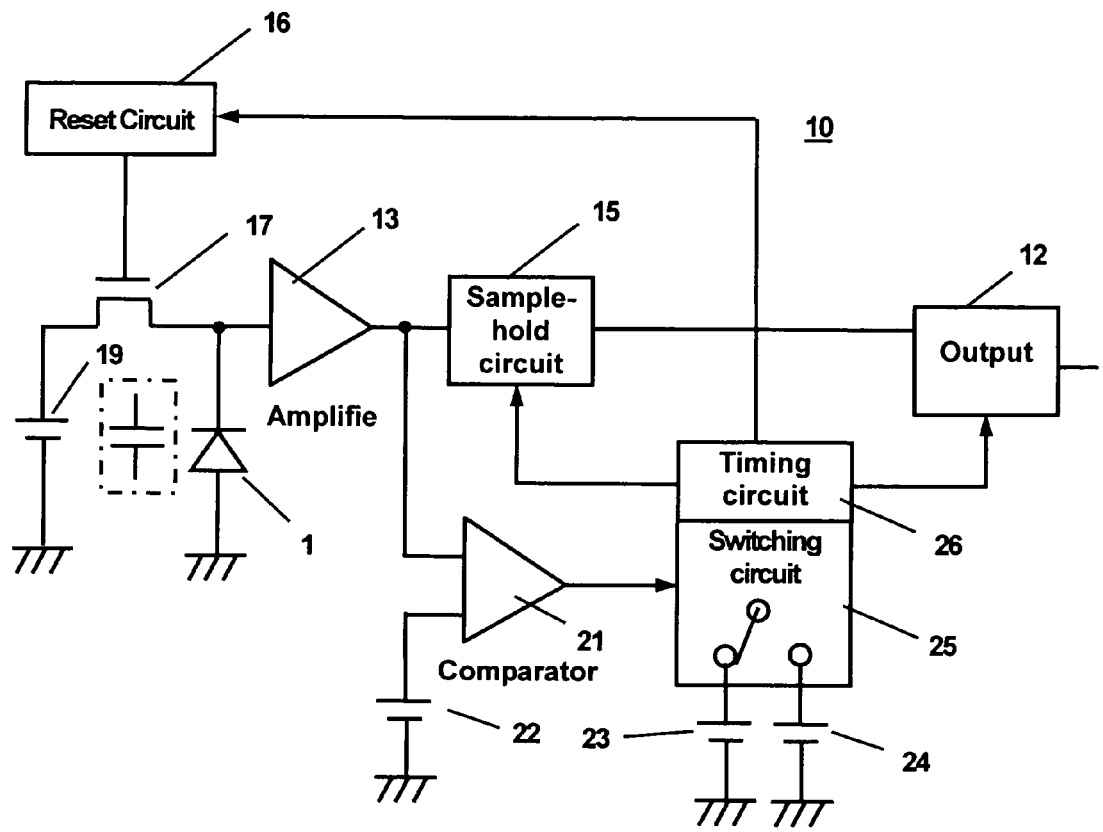
FIG. 2 is a block diagram for illustrating an example of switching circuit.

Next, with reference to FIG. 2, a specific configuration of the switching circuit 20 is described. The switching circuit 20 includes a comparator circuit 21, a switching circuit 25, and reference voltage sources 22, 23, and 24, compares magnitudes of the output voltage of the amplifier 13 and a predetermined voltage, and generates, based on the result of judgment, a signal for switching the reset interval of the reset circuit 16, a sample-hold signal of the sample-hold circuit 15, and a reference voltage of the output circuit 12. The switching circuit 25 includes a timing circuit 26 for timing the signals and timely switching the reference voltage sources 23 and 24.

The output circuit 12 is constituted of an amplifying circuit using an operational amplifier, and makes a unique output with respect to the received light intensity by performing arithmetic processing such as addition on the reference voltage, which is generated by the switching circuit 25 constituting the switching circuit, and the voltage proportional to the light intensity, which is held by the sample-hold circuit 15. The ambient illuminance can thus be determined.

The output circuit 12 is further connected to, for example, a luminance adjustment portion (not shown) for adjusting a luminance of a backlight in a liquid crystal display device, and the luminance adjustment portion is configured to adjust the luminance of the backlight of the liquid crystal display device based on the voltage value of the output circuit 12. In this case, the liquid crystal display device functions as image display means for displaying an image, and the luminance adjustment portion functions as luminance adjustment means for adjusting the luminance of the image display means based on a brightness judged by the output circuit 12.

With reference to FIG. 3, a principle of operation of the photodetection device 10 configured as above is described.

When the voltage reduction of the stored electric charge based on the light intensity (photocurrent) is represented by the voltage difference from the reference voltage $\Delta V$, relationship between a light intensity (photocurrent) I and stored electric charge Q is $Q=C\Delta V$, relationship among the photocurrent I, a storage time period T, and the stored electric charge Q is $Q=IT$, and the voltage difference $\Delta V$ may be expressed as $\Delta V=IT/C$. The photocurrent I may, accordingly, be expressed by the potential difference $\Delta V$ when T/C is a constant. The voltage difference $\Delta V$ has an upper limit value (saturation voltage) because of the circuit configuration, and hence the photocurrent of a wide range may be measured by setting a plurality of variable storage time periods T.

Figure 3A:
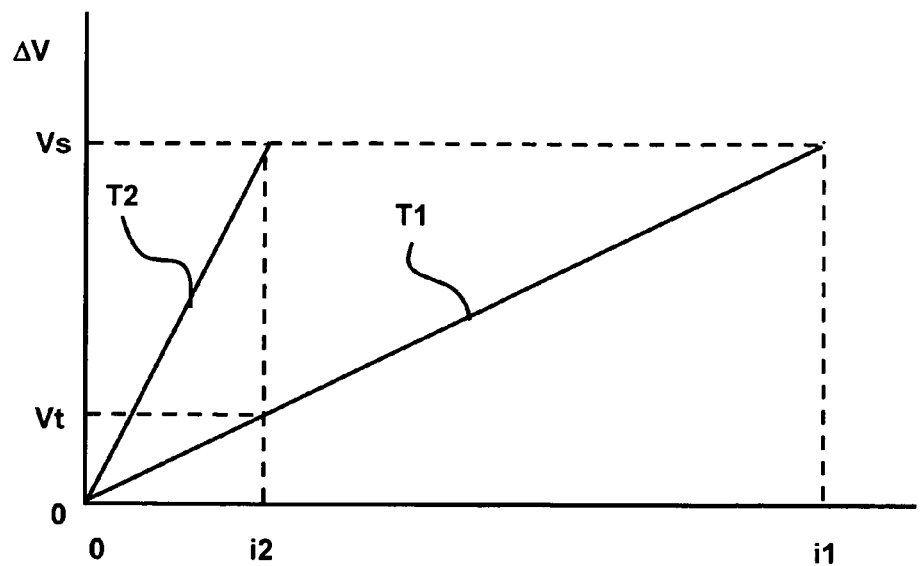
FIGS. 3A and 3B are graphs for illustrating an operation of the photodetection device according to the present invention.

FIG. 3A illustrates characteristics of the light intensity (photocurrent) I and the potential difference $\Delta V$ based on the stored electric charge for two storage time periods T1 and T2. In the figure, Vs represents the saturation voltage and is a value common for both the storage time periods T1 and T2. Further, it is a maximum light intensity (photocurrent) for the storage time period T1, and i2 is a maximum light intensity (photocurrent) for the storage time period T2. The values of the potential difference $\Delta V$ in the graph represent the voltage reduction $\Delta V$ (voltage difference from the reference voltage) of the stored electric charge corresponding to the light intensity (photocurrent) for the storage time periods T1 and T2. Vt is a detected value of the potential difference $\Delta V$ with respect to the light intensity (photocurrent) i2 for the storage time period T1.

A human eye senses the intensity of light not linearly but logarithmically. For example, the human eye can sense a change of 1 Lux in darkness, but cannot sense even a change of 100 Lux in brightness. In other words, the human eye is high in sensitivity (sensitive) in a dark environment, and is low in sensitivity (insensitive) in a bright environment.

As illustrated in FIG. 3A, the saturation voltage Vs is the same for the storage time periods T1 and T2, and hence the range of detected values of the light intensity (photocurrent) is wide for the storage time period T1 and is narrow for the storage time period T2. This indicates that a low resolution (low sensitivity) is obtained when the storage time period is short, and that a high resolution (high sensitivity) is obtained when the storage time period is long.

The characteristics similar to human eyes may be obtained by setting the low sensitivity (long storage time period) for the bright environment and high sensitivity (short storage time period) for the dark environment.

Next, a principle of operation of switching the sensitivity is described.

Figure 3B:
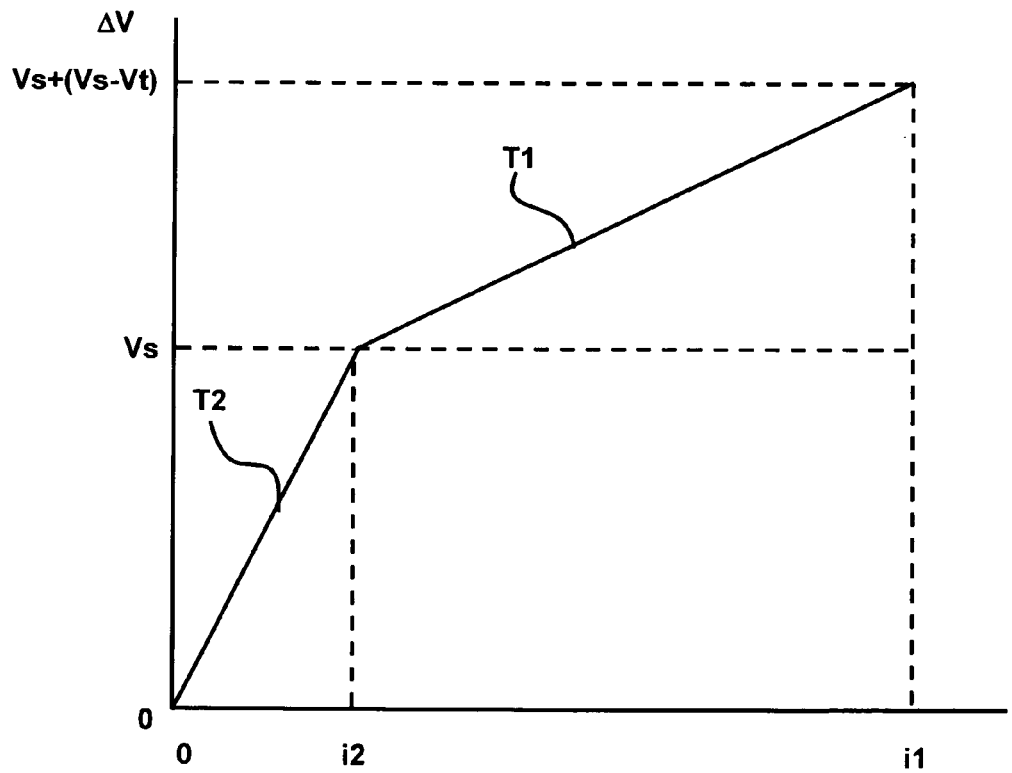
Figure 4:
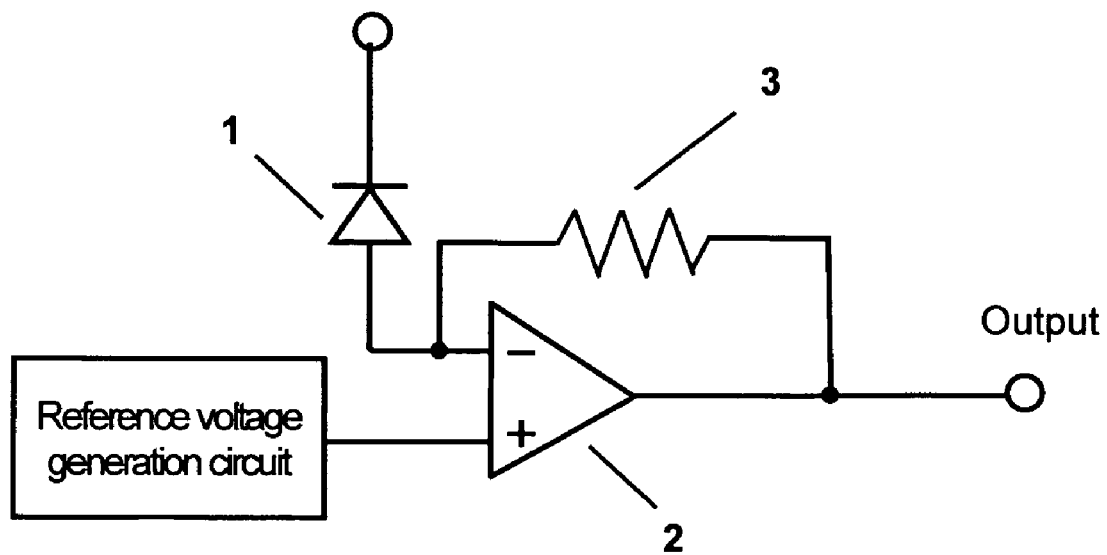
FIG. 4 is a circuit diagram illustrating a conventional photodetection device whose output voltage is proportional to an illuminance of light.
Figure 5:
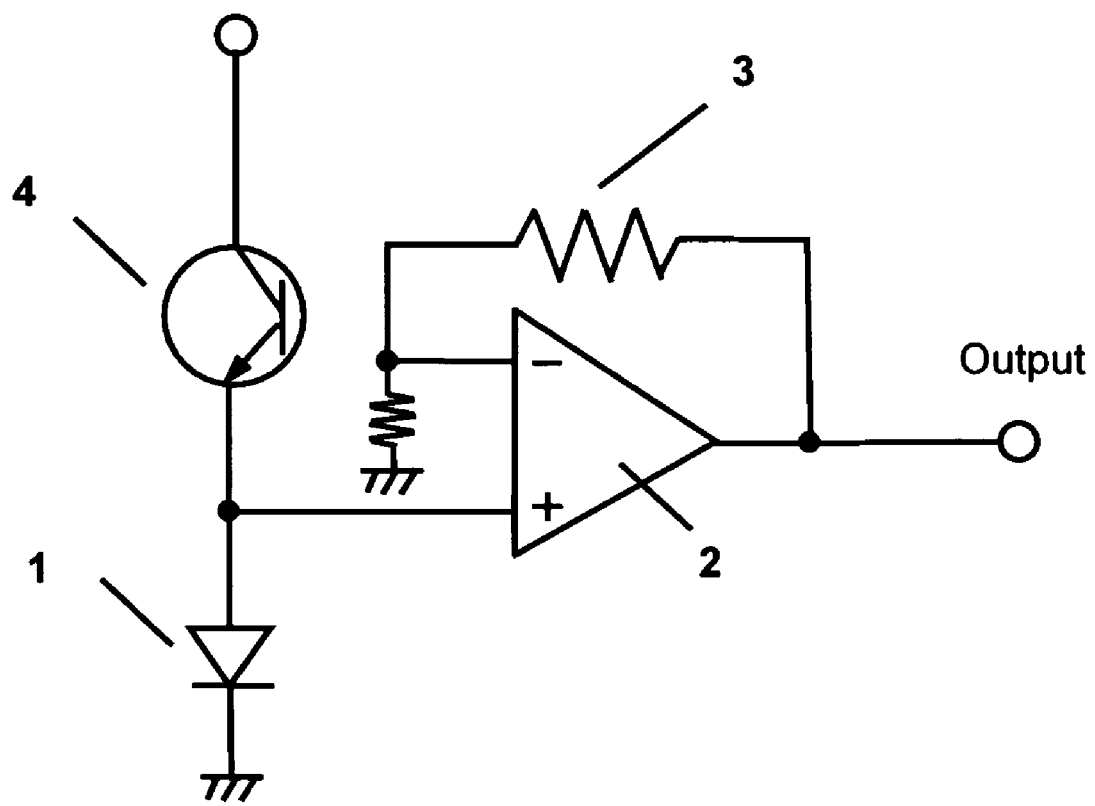
FIG. 5 is a circuit diagram illustrating a conventional photodetection device whose output voltage is proportional to a logarithm of an illuminance of light.

FIG. 3B illustrates characteristics obtained by combining the $\Delta V$-I linear characteristics for the storage time periods T1 and T2. In FIG. 3A, the potential differences $\Delta V$ for the storage time periods T1 and T2 are indistinguishable because the potential differences $\Delta V$ have the same voltage range for the storage time periods T1 and T2. However, considering the fact that the storage time periods T1 and T2 have relationship of T2>T1 and that the end point of the storage time period T1 is contained in the storage time period T2, the storage time period may be changed (extended) from T1 to T2 after the judgment at the end point of the storage time period T1.

At the end point of the storage time period T1, it is judged whether ΔV is larger or smaller than Vt. When ΔV is larger than Vt, (Vs−Vt) is added to ΔV to thereby obtain the detected value. When ΔV is smaller than Vt, the storage time period is changed (extended) from T1 to T2 to thereby obtain ΔV at the end point of the storage time period T2 as the detected value. This way, the two linear characteristics for the storage time periods T1 and T2 may be combined as illustrated in FIG. 3B.

As a result, output characteristics similar to human sense may be obtained as the high-sensitive linear characteristic of the storage time period T2 in the dark environment where the light intensity (photocurrent) I is 0 to i2, and as the low-sensitive linear characteristic of the storage time period T1 in the bright environment where the light intensity (photocurrent) I is i2 to i1.

The present invention has a feature that, in order to approximate the human sense, the storage time period is changed to switch the sensitivity based on the measurement value of the light intensity under the bright and dark environments, to thereby obtain an output with a wide dynamic range.

Hereinafter, a circuit operation is described.

First, a reset signal corresponding to the timing of the storage time period T1 is sent from the reset circuit 16 to turn on the switch 17. Accordingly, the cathode terminal of the photodiode 1 is set to the reference voltage by the DC power source 19, and the electric charge stored in the photodiode 1 is reset to the initial value.

Next, the reset circuit 16 turns off the switch 17 to disconnect the photodiode 1 from the DC power source 19. The amplifier 13 has infinite input impedance, and hence the cathode terminal is set to an open state in which the cathode terminal is electrically isolated from the circuit. In this case, as illustrated in the broken-lined box of FIGS. 1 and 2 respectively, a PN junction of the photodiode 1 functions as a capacitor to store the electric charge generated based on the light. The photodiode 1 has been reverse biased by the DC power source 19, and hence the electric charge stored in the photodiode 1 reduces the voltage of the cathode terminal at a rate corresponding to the intensity of light.

The amplifier 13 detects and amplifies the voltage of the cathode terminal of the photodiode 1, and sends the amplified voltage to the sample-hold circuit 15 and the switching circuit 20.

The switching circuit 20 compares the output ΔV of the amplifier 13 and the predetermined comparison voltage Vt at a timing of the storage time period T1.

In this comparison, when ΔV>Vt, the switching circuit 20 is configured to:

(1) stop switching the reset interval of the reset circuit 16 (output the reset signal corresponding to the timing of the storage time period T1);

(2) send the sample-hold signal to the sample-hold circuit 15 so that the sample-hold circuit 15 holds the output ΔV of the amplifier 13 (holds the output ΔV of the amplifier 13 at the timing of the storage time period T1); and (3) output the reference voltage Vs to the output circuit 12, and the output circuit 12 calculates the voltage ΔV+Vs (V) to output the voltage corresponding to the light intensity.

When ΔV<Vt, the switching circuit 20 is configured to:

(1) switch the reset interval of the reset circuit 16 to T2 (the reset signal is not sent at the timing of the storage time period T1 but the reset signal corresponding to the timing of the storage time period T2 is sent);

(2) stop sending the sample-hold signal to the sample-hold circuit 15 at the timing of T1. The comparator 21 sends the sample-hold signal at the next timing of T2 so that the output ΔV of the amplifier 13 is held (the output ΔV of the amplifier 13 is held at the timing of the storage time period T2); and (3) stop switching the reference voltage of the output circuit 12 at the timing of T1 and output 0 V at the timing of T2 so that the output circuit 12 calculates the voltage of ΔV+0 (V) to output the voltage based on the light intensity.

As described above, the photodetection device 10 may have, as illustrated in FIG. 3B, the high-sensitivity linear characteristic of T2 in the environment where the light intensity (photocurrent) is low, and a low-sensitivity linear characteristic of T1 in the bright environment. Accordingly, there may be provided a photodetection device suitable for building a system adapted to the sensing characteristic of human eyes. Further, the charge storage method in which the electric charge is stored in the photodiode is used, and hence the consumption current of the photodetection device may be reduced.

In this example, the reference voltage at the T1 timing is set to Vs (V), and the reference voltage at the T2 timing is set to 0 (V). However, the reference voltages may be changed depending on the characteristics of the amplifier of the output circuit and the like. Further, a case where two linear characteristics are combined has been described, but three or more linear characteristics may be combined in a similar manner.

In this example, a spectral characteristic of one photodiode is used, but two different spectral characteristics of the light receiving element (photodiode) may be input to the amplifier so as to obtain a desired spectral characteristic.

What is claimed is:

1. A photodetection device, comprising:
    a photoelectric conversion element in which a photocurrent is generated based on an illuminance of incident light and is stored as an electric charge for a predetermined storage time period;
    an amplifying circuit connected to the photoelectric conversion element for converting the electric charge into an output voltage; and
    a switching circuit connected to the photoelectric conversion element and the amplifying circuit for switching the storage time period,
    wherein the storage time period is switched so that the output voltage has a characteristic of a piecewise linear approximation of a logarithm of the illuminance of the incident light.

2. A photodetection device for converting a photocurrent generated based on an illuminance of incident light to a photoelectric conversion element to a voltage, comprising:
    a reverse-biased photodiode;
    an amplifier connected to an end of the reverse-biased photodiode;
    a DC power source connected to the reverse-biased photodiode through a switch so as to reset the reverse-biased photodiode to a predetermined voltage;
    a reset circuit for controlling the switch;
    a sample-hold circuit connected to an output of the amplifier;
    an output circuit connected to an output of the sample-hold circuit; and
    switching circuit connected to the output of the amplifier for switching a storage time period based on the output of the amplifier and controlling the sample-hold circuit, the reset circuit, and the output circuit so that an output voltage from the output circuit has a characteristic of a piecewise linear approximation of a logarithm of the illuminance of the incident light.

3. A photodetection device according to claim 2, wherein the switching circuit comprises:

a comparator circuit that receives the output of the amplifier; and a switching circuit that receives an output of the comparator circuit and includes a timing circuit.

* * * * *